United States Patent [19]

Yanagisawa

[11] Patent Number: 5,092,193
[45] Date of Patent: Mar. 3, 1992

[54] DRIVE SYSTEM

[76] Inventor: Ken Yanagisawa, c/o Kabushiki Kaisha Mechanic Sekkei Jimusho, 5175-1, Ooaza Toyoshina, Toyoshina-machi, Minamiazumi-gun, Nagano-ken, Japan

[21] Appl. No.: 533,869

[22] Filed: Jun. 6, 1990

[51] Int. Cl.⁵ .............................. G05G 11/00
[52] U.S. Cl. ........................ 74/479; 33/1 M; 248/913
[58] Field of Search ............ 33/1 M; 74/479; 108/143; 248/656, 657, 913

[56] References Cited

U.S. PATENT DOCUMENTS

| | | | |
|---|---|---|---|
| 3,801,090 | 4/1974 | Gillen | 248/913 X |
| 4,171,657 | 10/1979 | Halberschmidt et al. | 33/1 M X |
| 4,233,740 | 11/1980 | Bunn et al. | 248/913 X |
| 4,409,860 | 10/1983 | Moriyama et al | 74/479 |
| 4,566,346 | 1/1986 | Petiteau | 74/479 X |
| 4,995,277 | 2/1991 | Yanagisawa | 74/479 X |

FOREIGN PATENT DOCUMENTS 3412848 10/1985 Fed. Rep. of Germany ........ 74/479
53-36869 4/1978 Japan .

Primary Examiner—Allan D. Herrmann
Assistant Examiner—David W. Laub

[57] ABSTRACT

In a drive system of the present invention, a first slider can be moved in first and second directions by movement of first travellers and second travellers. A second slider can be moved in the first and the second directions in a plane which is located away from a plane in which the first slider moves. A third slider can be moved in the second of the first direction on the second slider. Therefore, the first and the third sliders can be synchronously moved despite the plane in which the first slider moves and the plane in which the third slider moves being separated from each other.

19 Claims, 7 Drawing Sheets ns.

DRIVE SYSTEM

BACKGROUND OF THE INVENTION

The present invention relates to a drive system, more specifically it relates to a drive system capable of synchronously moving two sliders.

Various drive systems for moving a driven body in a plane have been known. For example, there was disclosed a two dimentional drive system, which defines the position of works or tools, etc. attached on a driven body, in Japanese Provisional Publication (Kokai) Gazette No. 53-36869. The system was a drive system for a working table, and it has a first slider which is moved in a first direction by first driving means, and a second slider as the driven body which is provided on the first slider and is moved in a second direction perpendicular to the first direction by second driving means. Works to be machined or tools, etc. are attached on the second slider, so that they can be moved in a plane and positioned therein. Therefore, this drive system has been used for automated machinery.

However, there are disadvantages in the above noted conventional drive system.

For example, in an automatic chip-inserting machine, which automatically inserts IC-chips in a printed circuit board (PC board), having a conventional drive system, an inserting tool is attached on a driven body and an IC-chip is picked up by the tool. The IC-chip picked up is carried to a prescribed position on the PC board with the movement of the driven body to insert therein. Upon inserting, the PC board is bent downward because of low hardness. When inserting pressure applied to the PC board is too high, the PC board is bent beyond its elastic limit, so that the PC board is sometimes broken. To solve this problem, it is effective to provide a supporting member below the PC board. But it is necessary to change the supporting member or the position thereof when the size or inserting position of the PC boards is changed. Then using two drive systems was proposed. Namely, two drive systems are set apart in the vertical direction, two driven bodies are synchronously moved, and the supporting member is attached on the driven body of the lower drive system. With this structure, the problem is solved but there are other disadvantages: high manufacturing cost and difficult synchronous control of the two driven bodies.

SUMMARY OF THE INVENTION

An object of the present invention is to provide a drive system having a simple structure and which can be synchronously moved by two driven members.

To achieve the object, drive systems of the present invention have these structures.

The first structure is, a drive system, comprising:

a pair of first driving means provided in parallel in a first direction;

a pair of second driving means provided in parallel in a second direction perpendicular to the first direction;

a pair of first travellers movably provided to the first driving means, the first travellers being movable along the first driving means;

a pair of second travellers movably provided to the second driving means, the second travellers being movable along the second driving means;

a first motor for driving the first driving means to synchronously move the first travellers in the first direction;

a second motor for driving the second driving means to synchronously move the second travellers in the second direction;

a first rod having both ends respectively connected to the first travellers, the first rod provided in parallel to the second driving means;

a second rod having both ends respectively connected to the second travellers, the second rod provided in parallel to the first driving means;

a first slider movably provided on the first rod and the second rod, the first rod and the second rod passing through the first slider;

a first guide located away from a plane in which the first slider moves, the first guide provided in parallel to the first driving means or the second driving means;

a second slider being movable along the first guide;

first connecting means for substantially connecting the second slider to or disconnecting the same from the first traveller or the second traveller, the second slider being movable along the first guide with the movement of the first slider when the first connecting means connects;

a second guide provided on the second slider perpendicular to the first guide;

a third slider being movable along the second guide; and second connecting means for substantially connecting the third slider to or disconnecting the same from the second traveller or the first traveller, the third slider being movable along the second guide with the movement of the first slider when the second connecting means connects.

The second structure is, a drive system, comprising:

a pair of first driving means provided in parallel in a first direction;

a pair of second driving means provided in parallel in a second direction perpendicular to the first direction;

a pair of first travellers movably provided to the first driving means, the first travellers being movable along the first driving means;

a pair of second travellers movably provided to the second driving means, the second travellers being movable along the second driving means;

a first motor for driving the first driving means to synchronously move the first travellers in the first direction;

a second motor for driving the second driving means to synchronously move the second travellers in the second direction;

a first rod having both ends respectively connected to the first travellers, the first rod provided in parallel to the second driving means;

a second rod having both ends respectively connected to the second travellers, the second rod provided in parallel to the first driving means;

a first slider movably provided on the first rod and the second rod, the first rod and the second rod passing through the first slider;

a first guide provided to be separated away from a plane in which the first slider moves, the first guide provided in parallel to the first driving means or the second driving means;

a second slider being movable along the first guide;

first connecting means for substantially connecting the second slider to or disconnecting the same from the first traveller or the second traveller, the second slider being movable along the first guide with the movement of the first slider when the first connecting means connects;

a second guide provided on the second slider perpendicular to the first guide; and a third slider being movable along the second guide, the third slider being connected to the second traveller or the first traveller.

And the third structure is, a drive system, comprising:

a pair of first driving means provided in parallel in a first direction;

a pair of second driving means provided in parallel in a second direction perpendicular to the first direction;

a pair of first travellers movably provided to the first driving means, the first travellers being movable along the first driving means;

a pair of second travellers movably provided to the second driving means, the second travellers being movable along the second driving means;

a first motor for driving the first driving means to synchronously move the first travellers in the first direction;

a second motor for driving the second driving means to synchronously move the second travellers in the second direction;

a first rod having both ends respectively connected to the first travellers, the first rod provided in parallel to the second driving means;

a second rod having both ends respectively connected to the second travellers, the second rod provided in parallel to the first driving means;

a first slider movably provided on the first rod and the second rod, the first rod and the second rod passing through the first slider;

a first guide provided to be separated away from a plane in which the first slider moves, the first guide provided in parallel to the first driving means or the second driving means;

a second slider being movable along the first guide, the second slider connected to the first traveller or the second traveller; and a third slider being movable along the second guide, the third slider being connected to the second traveller or the first traveller.

In each of above noted structures, ball bearing screws can be used as the first driving means and the second driving means. Further, a pair of first ball bearing screws and a pair of second ball bearing screws can be rotated by a single first motor and a single second motor.

In the present invention, the first slider is moved in the first and the second directions with the movement of the first travellers and the second travellers. The second slider can be moved in the first or second direction in a plane separated away from the plane in which the first slider moves. And the third slider can be moved in the second or first direction on the second slider. Therefore, the first and third sliders can be synchronously moved with a separation therebetween.

BRIEF DESCRIPTION OF THE DRAWINGS

Embodiments of the present invention will now be described by way of examples and with reference to the accompanying drawings, in which.

DETAILED DESCRIPTION OF THE PREFERRED EMBODIMENTS

Preferred embodiments of the present invention will now be described in detail with reference to the accompanying drawings.

In these embodiments, an automatic chip-inserting machine having the drive system of the present invention will be described.

Figure 1:
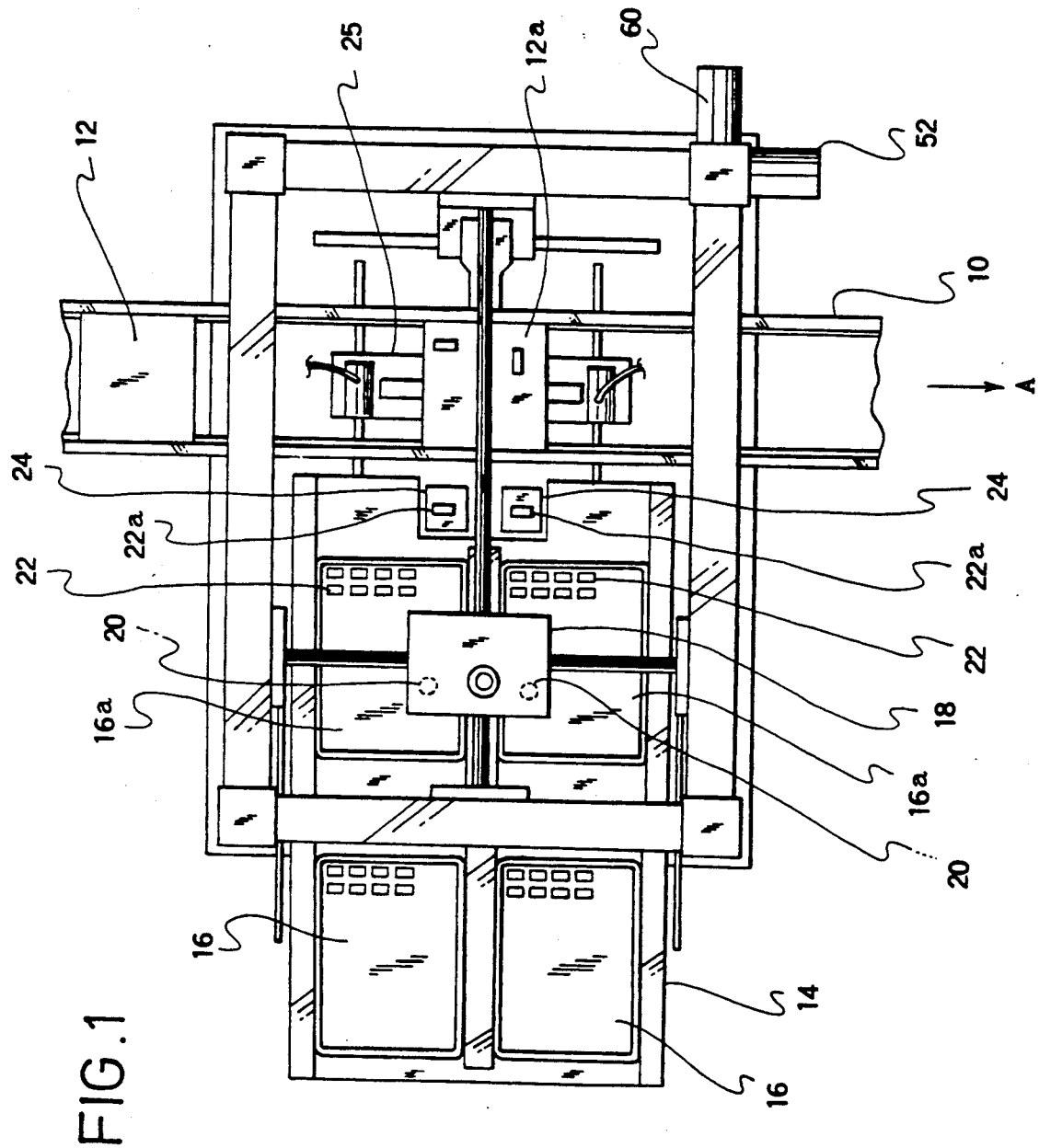
FIG. 1 shows a plan view of an automatic chip-inserting machine having the drive system of the present invention.
Figure 2:
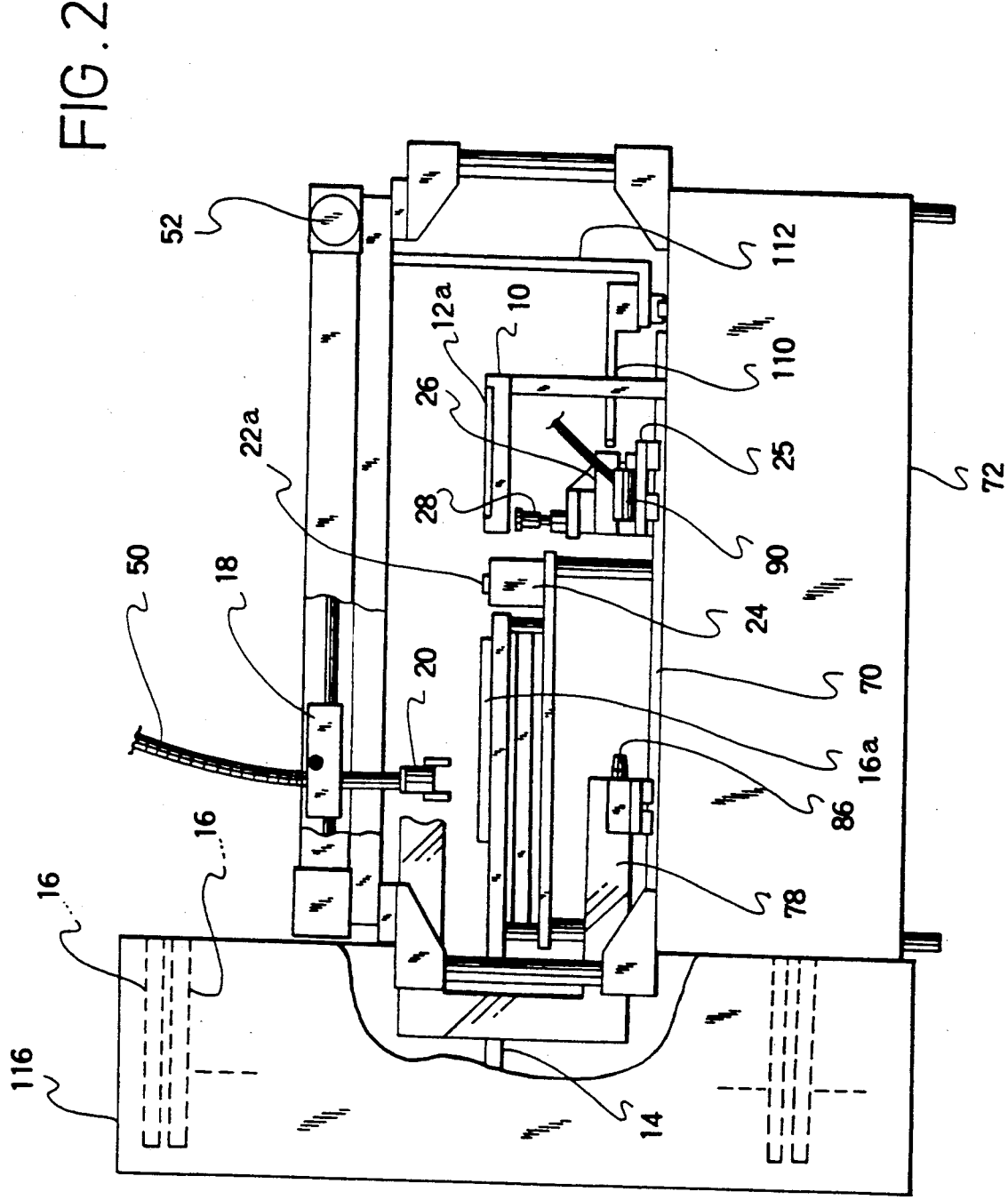
FIG. 2 shows a partially cutaway front view thereof.

FIG. 1 shows a plan view of the machine and FIG. 2 shows a partially cutaway front view thereof.

First, the operation of the machine will be explained.

A PC board 12 is carried in the direction of an arrow A to an inserting position by a conveyor 10. IC-chips 22 in stockers 16a which are at a pick-up position on a conveyor 14, are picked up by hand units 20 which are attached on a bottom face of a first slider 18. IC-chips 22 are picked up and put on intermediate stages 24 and precisely located thereon. IC-chips 22a are picked up by the hand units 20 again and carried to a position over a PC board 12a, which is located at the inserting position to insert the IC-chips 22 therein. While the first slider 18 carries the IC-chips 22a, a third slider 26, which is movably provided on a second slider 25, synchronously moves together with the first slider 18. Namely, the first slider 18 and the third slider 26 locate at the same two dimentional coordinates while the first slider 18 carries the IC-chips 22a. With this synchronous movement, a supporting mechanism 28, which is provided on the third slider 26, is capable of supporting the bottom face of the PC board 12a.

Next, the detailed structure will be explained.

Figure 3:
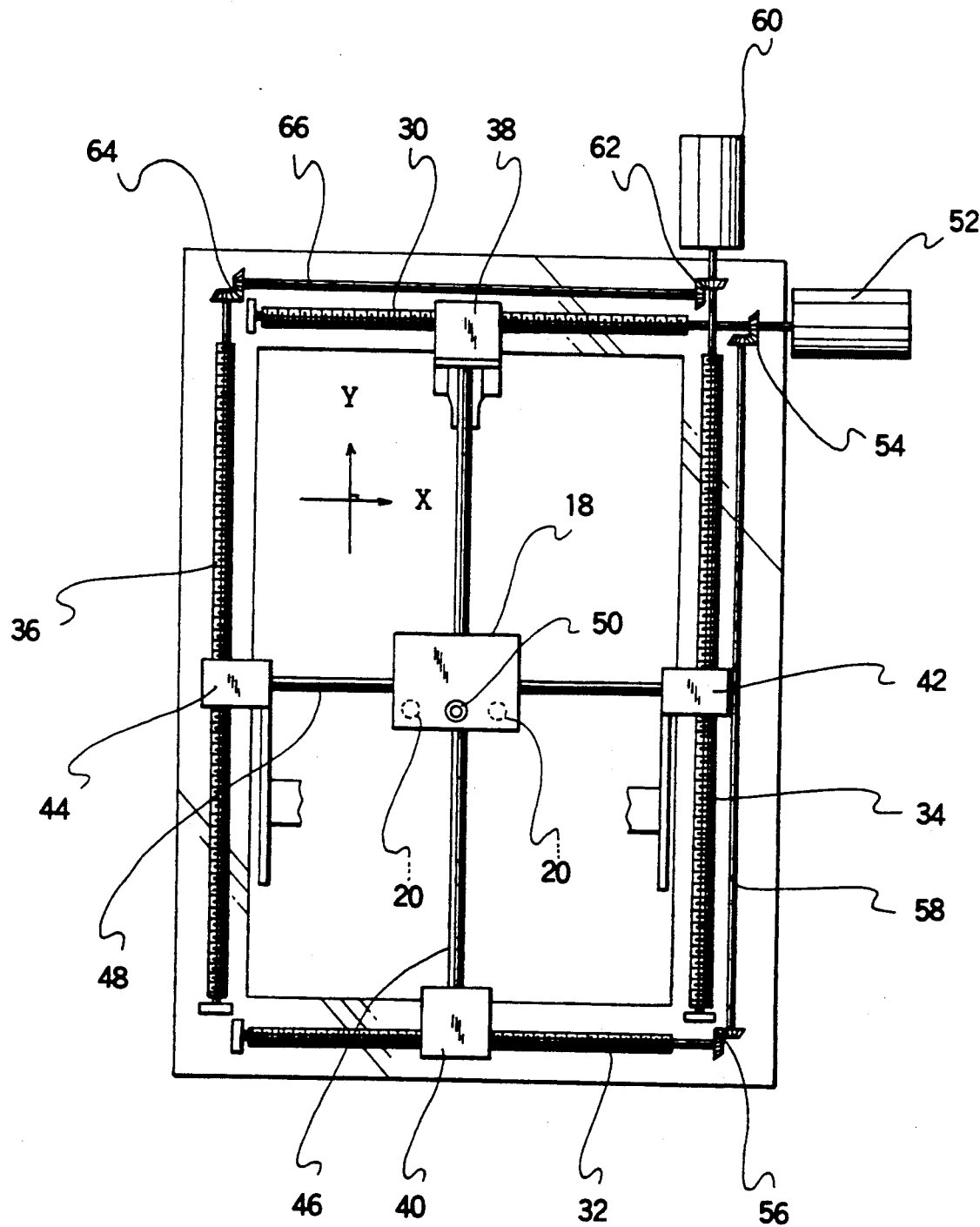
FIG. 3 shows a schematic plan view of a driving mechanism of the first slider.

A driving mechanism of the first slider 18 will be explained with reference to FIG. 3.

X-ball bearing screws 30,32 are a pair of first driving means. The X-ball bearing screws 30 and 32 are mutually arranged in parallel in the direction of an X-axis direction as a first direction.

Y-ball bearing screws 34,36 are a pair of second driving means. The Y-ball bearing screws 34 and 36 are mutually arranged in parallel in the direction of a Y-axis direction as a second direction perpendicular to the X-axis direction.

X-travellers 38,40 are a pair of first travellers. The X-ball bearing screws 30 and 32 are respectively threaded through the X-travellers 38 and 40.

Y-travellers 42,44 are a pair of second travellers. The Y-ball bearing screws 34 and 36 are respectively threaded through the Y-travellers 42 and 44.

X-rod 46 is a first rod. Each end of the X-rod 46 is respectively connected to the X-travellers 38 and 40. The X-rod 46 is always parallel to the Y-ball bearing screws 34 and 36. Therefore, the X-travellers 38 and 40 and the X-rod 46 move together in the X-axis direction when the X-ball bearing screws 30 and 32 are rotated in same direction at same speed.

Y-rod 48 is a second rod. Each end of the Y-rod 48 is respectively connected to the Y-travellers 42 and 44. The Y-rod 48 is always parallel to the X-ball bearing screws 30 and 32. Therefore, the Y-travellers 42 and 44 and the Y-rod 48 move together in the Y-axis direction when the Y-ball bearing screws 34 and 36 are rotated in same direction at the same speed.

Note that, by connecting the X-rod 46 to the X-travellers 38 and 40, the rotation of the X-travellers 38 and 40 is prevented by the X-rod 46 when the X-ball bearing screws 30 and 32 are rotated, and the X-travellers 38 and 40 can be moved in the X-direction. By connecting the Y-rod 48 to the Y-travellers 42 and 44, the rotation of the Y-travellers 42 and 44 is prevented by the Y-rod 48 when the Y-ball bearing screws 34 and 36 are rotated, and the Y-travellers 42 and 44 can be moved in the Y-direction.

The X-rod 46 and the Y-rod 48 pass through and perpendicularly cross in the first slider 18. The slider 18 can be moved in the x and y directions with the movement of the X-travellers 38 and 40 and the Y-travellers 42 and 44.

There are provided the hand units 20 on the bottom face of the first slider 18. The hand units 20 are driven by a vacuum unit (not shown), which is connected by tube 50, so as to pick-up and to release IC-chips 22.

X-motor 52 is a first motor. The torque of the X-motor 52 is directly transmitted to the X-ball bearing screw 30, and is transmitted to the X-ball bearing screw 32 via a connecting rod 58 and bevel gears 54 and 56 as a first transmitter.

Y-motor 60 is a second motor. The torque of the Y-motor 60 is directly transmitted to the Y-ball bearing screw 34, and is transmitted to the Y-ball bearing screw 34 via a connecting rod 66 and bevel gears 62 and 64.

Note that the X-motor 52 and the Y-motor 60 are servo motors.

Figure 4:
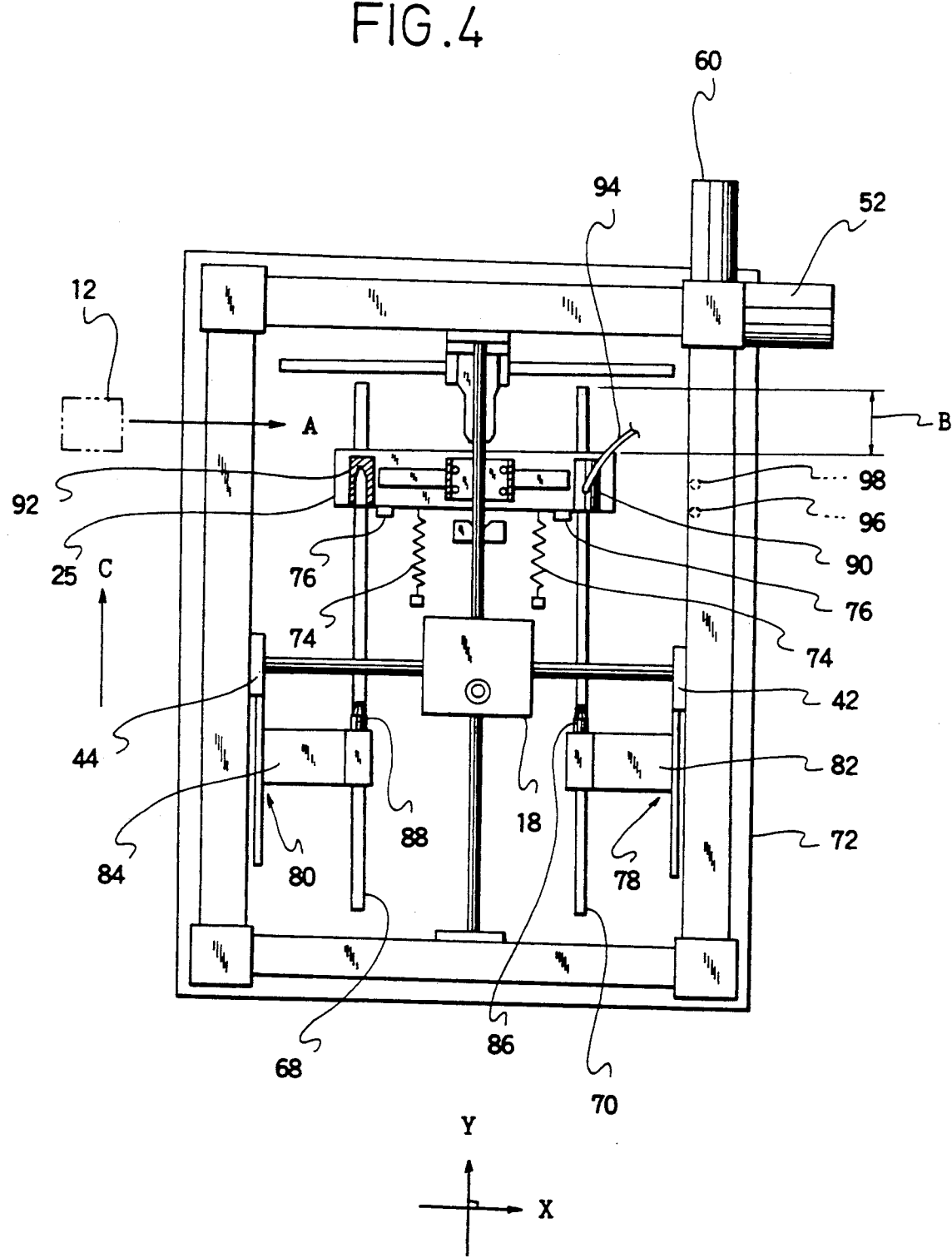
FIG. 4 shows a schematic plan view of a driving mechanism of the second slider.

Next, a driving mechanism of the second slider 25 will be explained with reference to FIG. 4.

First guides 68, 70 are arranged in parallel to the Y-ball bearing screws 34 and 36 on an upper face of a base 72, which is provided below the X-ball bearing screws 30 and 32 and the Y-ball bearing screws 34 and 36. The bottom face of the second slider 25 is slidably fitted to the first guides 68 and 70, so that the second slider 25 can be moved in the Y-direction. The second slider 25 is always energized toward the X-ball bearing screw 32 by springs 74 but stoppors 76 on the base 72 limit the movement of the second slider 25. Therefore, the amount of the movement of the second slider 25 is up to the amount B.

Brackets 78, 80 are formed as a toppled U shape so as not to contact the conveyor 10, etc. Each upper end of the brackets 78 and 80 is respectively connected to the Y-travellers 42 and 44. Horizontal sections 82 and 84 are horizontally extended inward from each lower end of the brackets 78 and 80. Each bottom face of the horizontal sections 82 and 84 are respectively fitted to the first guides 70 and 68 slidably in the Y-axis direction. There are respectively provided tapered sections 86 and 88 on the upper faces of the horizontal sections 82 and 84. The free end of each of tapered sections 86 and 88 is formed a tapered-shape. There are respectively provided tapered cylinders 90 and 92 at both side ends and on the upper faces of the second slider 25. The shape of the inner space of the tapered cylinders 90 and 92 is formed to correspond to the shape of the tapered sections 86 and 88. Note that, a first connecting means is composed of the tapered sections 86 and 88 as rod-bodies and the tapered cylinders 90 and 92. The tapered cylinders 90 and 92 are connected to a vacuum unit (not shown) by tubes 94 . . . The tapered sections 86 and 88 are respectively capable of fitting into the tapered cylinders 90 and 92 when the first slider 18 moves in the direction of an arrow C. When the tapered sections 86 and 88 approach the tapered cylinders 90 and 92, a sensor 96 detects the forward movement of the tapered sections 86 and 88, and then negative air pressure in the inner spaces of the tapered cylinders 90 and 92 is provided by the vacuum unit. Upon having negative pressure in the tapered cylinders 90 and 92, the tapered sections 86 and 88 and the tapered cylinders 90 and 92 are connected. With this connection, the second slider 25 is connected to the Y-travellers 42 and 44 by the brackets 78 and 80 and the first connecting means. Therefore, the second slider 25 can be moved in a length shown as B, and can be moved together with the first slider 18 in the Y-axis direction. Note that, when the first slider 18 moves in a direction the reverse of the arrow C so as to disconnect, a sensor 98 detects the backward movement of the first slider 18, and the vacuum unit pressurizes the tapered cylinders 90 and 92, so that the tapered sections 86 and 88 are disconnected from the tapered cylinders 90 and 92.

Figure 5:
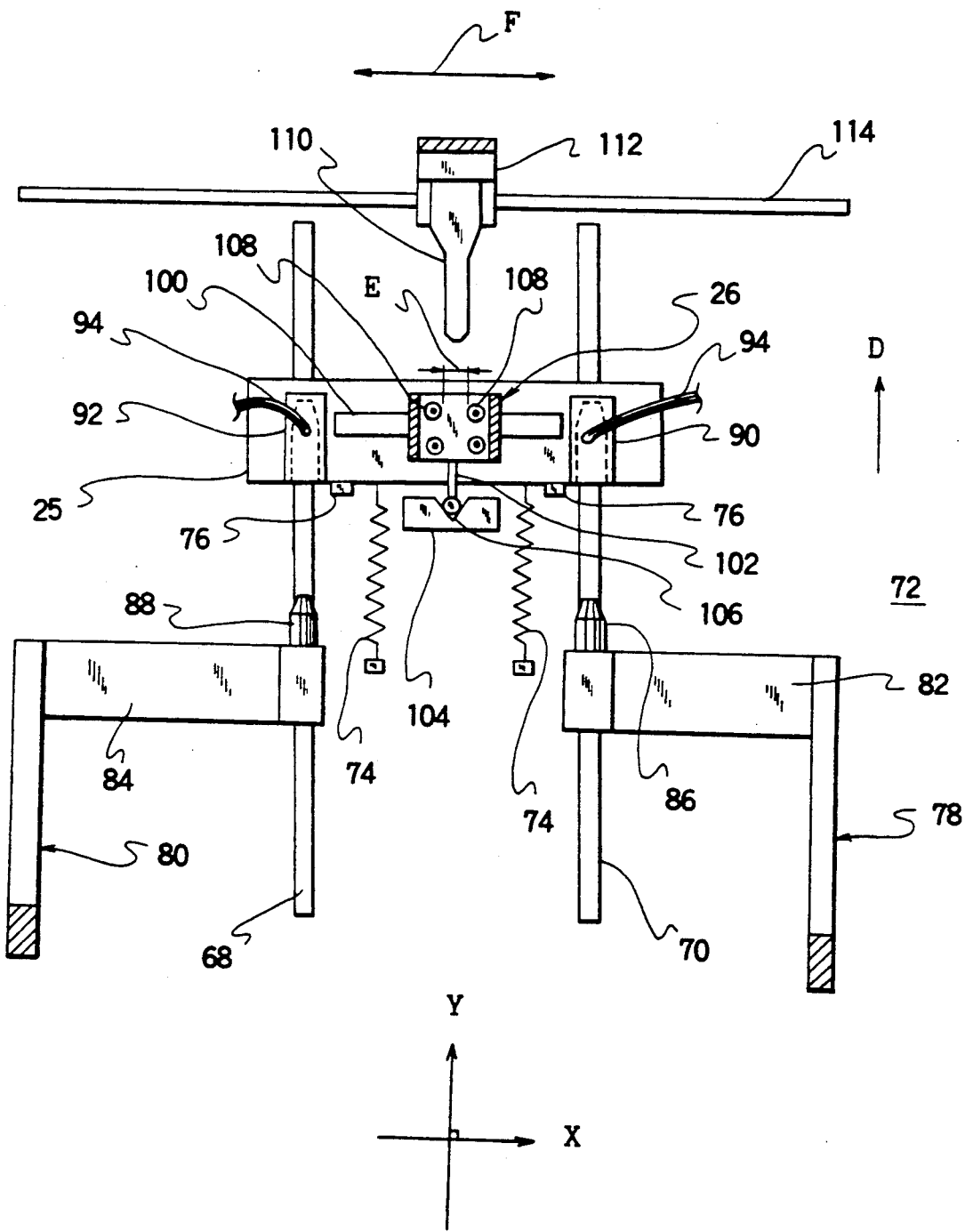
FIG. 5 shows a schematic plan view of a driving mechanism of the third slider.

Next, a driving mechanism of the third slider 26 will be explained with reference to FIG. 5.

A second guide 100 is provided on the second slider 25. The second guide is perpendicularly arranged to the first guides 68 and 70. The bottom face of the third slider 26 is slidably fitted to the second guide 100, so that the third slider 26 can be moved in the X-axis direction. The third slider 26 has a projected section 102. When the end of the projected section 102 enters into a V-cut section 106 of a positioning member 104, which is fixed on the upper fase of the base 72, the third slider 26 is located at home position (or initial position). There is provided the supporting mechanism 28 having a cylinder unit on the upper face of the third slider 26, and the third slider 26 has a hollow section, which is made hollow in the Y-axis direction. In the hollow section of the third slider, guide rollers 108 are rotatably provided.

An extended section 110 is provided at a lower end of an L-shaped bracked 112, whose upper end is connected to the X-traveller 38. Note that, a second connecting means is composed of the extended section 110 and the guide rollers 108.

The bottom face of the bracket 112 is slidably fitted to a third guide 114, which is provided in the X-axis direction on the base 72. The width of the extended section 110 is slightly narrower than the clearance E between the guide rollers 108, so that the extended section 110 can enter into the clearance E. Therefore, when the tapered sections 86 and 88 are connected to the tapered cylinders 90 and 92 and the first slider 18 moves forward (in the direction of the arrow C or D), the second slider 25 is pressed to move against the elasticity of the springs 74 in the direction of the arrow D along the first guide 68 and 70. With this movement, the extended section 110 enters into the clearance E between the guide rollers 108, so that the third slider 26 is connected to the X-traveller 38 by the extended section 110 and the bracket 112. While the second connecting means is connected, the third slider 26 can be moved together with the first slider 18 in the X-axis direction as far as the length of the second guide 100. Namely, the third slider 26 moves together with the second slider 25 in the Y-axis direction, so that the third slider 26 moves together with the first slider 18 in the Y-axis direction. Therefore, the first slider 18 and the third slider 26 synchronously move, and their two dimentional coordinates are the same when the first and the second connecting means connect.

Successively, the function of the automatic chip-inserting machine having the above described structure will be explained.

The stockers 16 piled in a magazine 116 are carried to the pick-up position by the conveyor 14.

PC boards 12 in which IC-chips 22 will be inserted are carried to the inserting position by the conveyor 10.

First, the first slider 18 is moved to the pick-up position by driving the X- and Y- motors 52 and 60. IC-chips 22 on the stockers 16a at the pick-up position are picked up by the hand units 20, and are carried to the intermediate stages 24 so as to precisely positioned thereon. After then the IC-chips 22a on the intermediate stages 24 are picked up by the hand units 20 again. The first slider 18 further moves in the directions of the arrow C, then the sensor 96 detects the slider 18 and the vacuum unit (not shown) is driven so as to give the tapered cylinders 90 and 92 negative pressure. When the tapered sections 86 and 88 enter into the tapered cylinders 90 and 92, the first connecting means connects and the first and the second sliders 18 and 25 move in the Y-axis direction together. The first slider 18 further moves in the direction of the arrow C against the elasticity of the springs 74, and it presses to move the second slider 25 in the direction of the arrow D, so that the extended section 110 gets into the clearance E between the guide rollers 108 of the third slider 26. With this connection, the first and the third sliders 18 and 26 can be moved together, and the hand units 20, which have picked IC-chips 22 up, attached to the first slider 18 approaches to the PC board 12a at the inserting position. To insert IC-chips 22 in the PC board 12a, the first slider 18 executes complex two dimentional movement but the third slider 26 can execute the same two dimentional movement. Therefore, the supporting mechanism 28, which is provided on the upper face of the third slider 26, can always support the bottom face of the PC board 12a, which correspond to any chip-inserting positions. With this support, the PC board 12a can be protected from damages occurred by bending when IC-chips 22 are inserted therein.

Upon completing inserting IC-chips, the first slider 18 moves back in the counter direction of the arrow C. The extended section 110 gets out from the guide rollers 108 to disconnect the third slider 26 from the first slider 18. When the first slider 18 further moves backword, the sensor 98 detects the first slider 18, so that the tapered section 86 and 88 are disconnected from the tapered cylinders 90 and 92 by the vacuum unit. Upon disconnection, the second slider 25 is moved back to the home position, at which time the second slider 25 contacts the stoppers 76, by the springs 74. The projected section 102 of the third slider 26 is guided by the V-cut section 106 of the positioning member 104, so that the third slider 26 is also moved back to the home position on the second guide 100.

Thereafter the first slider 18 carries other IC-chips 22, and the IC-chips 22 will be inserted in another PC-board 12 by the same manner. Note that the whole operation of the machine is controlled by a control unit having a micro computer system.

Another embodiment of the connecting means will be described with reference to FIGS. 6 and 7. Note that the elements which are the same as the former embodiment are assigned same numerals and their explanation will be omitted.

Figure 6:
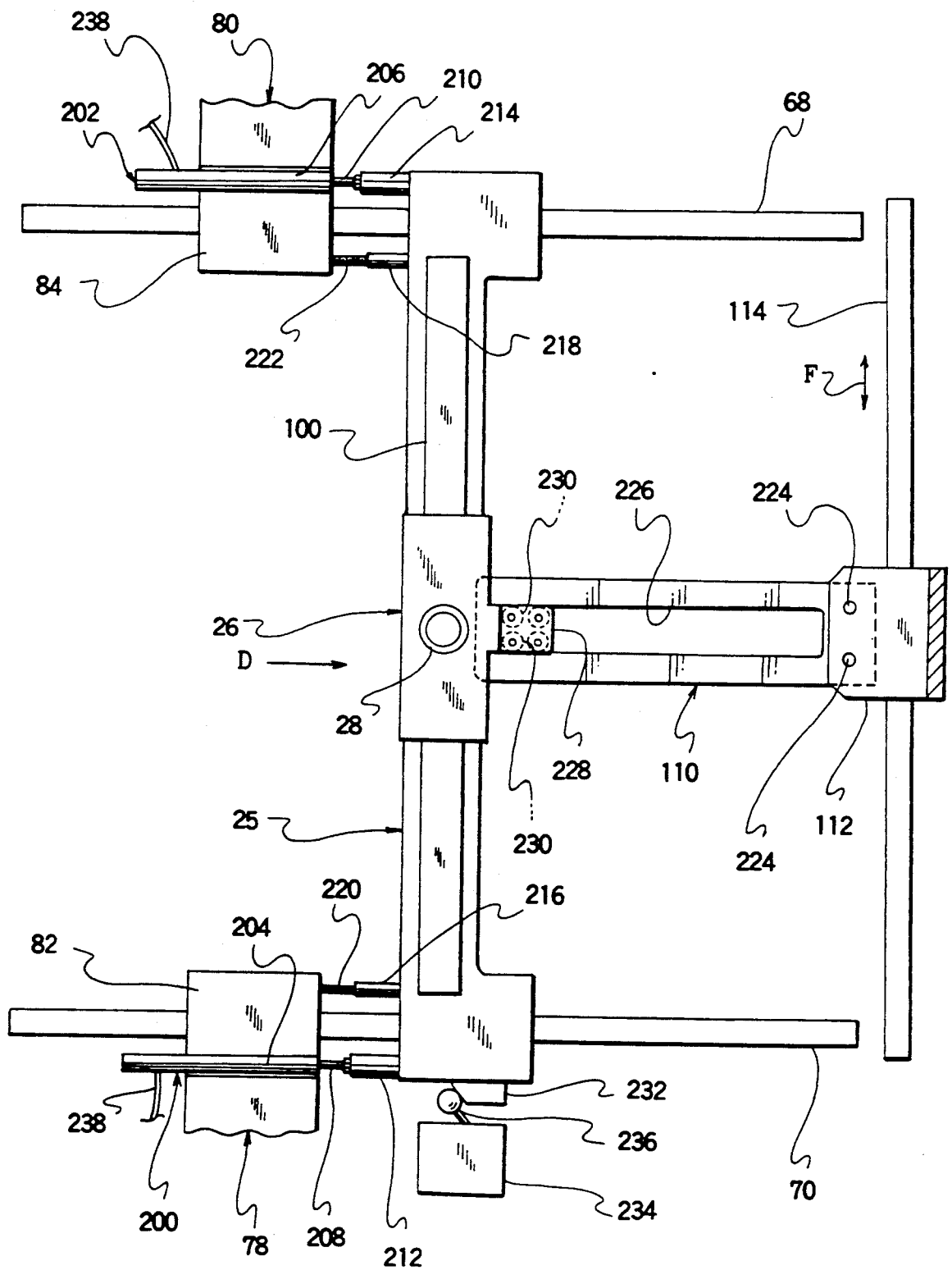
FIG. 6 shows a schematic plan view of another driving mechanism of the third slider.
Figure 7:
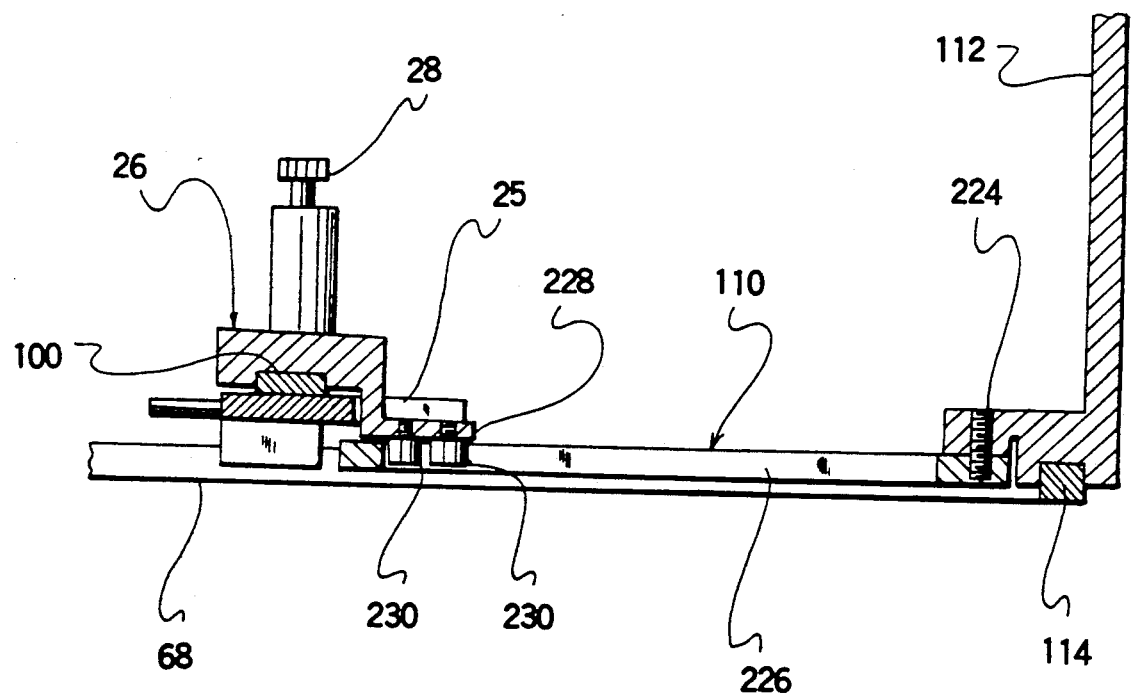
FIG. 7 shows a front sectional view of the driving mechanism of FIG. 6.

In FIGS. 6 and 7, air cylinder units 200 and 202 are used as the first connecting means. The cylinder propers 204 and 206 of the air cylinder units 200 and 202 are respectively fixed on the horizontal sections 82 and 84 of the brackets 78 and 80. The rods 208 and 210 of the air cylinder units 200 and 202 are drawn into the cylinder propers 204 and 206 when the air cylinder units 200 and 202 are driven; the rods 208 and 210 can be freely extended and drawn when the air cylinder units 200 and 202 are not driven. The front ends of the rods 208 and 210 are respectively connected to fixed sections 212 and 214 on the rear face of the second slider 25. Therefore, the second slider 25 can be moved together with the Y-travellers 42 and 44 (see other Figs.), which are connected to the second slider 25 by the backets 78 and 80, when the air cylinder units 200 and 202 are pressurized. When the air cylinder units 200 and 202 are not pressurized, the second slider 25 can be freely moved as far as the stroke of rods 208 and 210, so that the first slider 18 (see other Figs.) and the second slider 25 are substantially disconnected from each other.

Stoppers 216, 218 are projected backward from the rear face of the second slider 25. Screw rods 220, 222 are screwed in the front faces of the horizontal section 82 and 84 of the brackets 78 and 80. The screw rods 220 and 222 can be contacted the stoppers 216 and 218. By adjusting the projected length of the screw rods 220 and 222 from the horizontal sections 82 and 84, the degree of the right angle between the second guide 100 and the first guides 68 and 70 can be adjusted.

The one end of the extended section 110 is fixed at the bracket 112 by bolts 224. The center area of the extended section 110 is formed as a hollow section 226. In the hollow section 226, eccentric rollers 230 are rotatably attached on the bottom face of a section 228 extended from the third slider 26. The eccentric rollers 230 can always contact the longitudinal inner faces of the hollow section 226. Therefore, the third slider 26 can be moved together with the X-travellers 38 (see other Figs.) in the direction of an arrow F along the second guide 100. The free movement of the third slider 26 in the longitudinal direction of the extended section 110 (the arrow D) is limited as far as the length of the hollow section 226.

In this embodiment, when a switching piece 232 provided to the second slider 25 does not contact a switch 236 of a valve unit 234, compressed air is supplied to the air cylinder units 200 and 202 via tubes 238, so that the rods 208 and 210 are drawn until the stoppers 216 and 218 contact the screw rods 220 and 222, and the first slider 18 and the second slider 25 are substantially connected. Therefore, the second slider 25 and the first slider 18 move synchronously.

When the second slider moves back in the counter direction of the arrow D, and the eccentric rollers 230 moves back as far as the length of the hollow section 226 of the extended section 110, the switching piece 232 contacts the switch 236 of the valve unit 234 as shown in FIG. 6, so that the air cylinder units 200 and 202 are stopped pressurizing. Upon stopping pressurizing to the air cylinder units 200 and 202, the rods 208 and 210 can be freely extended and drawn, and the first slider 18 and the second slider 25 are substantially disconnected each other, so that the first slider 18 can be independently moved as far as the stroke of the rods 208 and 210.

Note that, in this structure shown in FIGS. 6 and 7, the cylinder propers 204 and 206 may be provided to the second slider 25, and the front ends of the rods 208 and 210 may be fixed to the brackets 78 and 80.

Further, if the air cylinder units 200 and 202 are always pressurized, namely in the case that the first connecting means always connects the first and the second sliders 18 and 25, the third slider 26 and the first slider 18 are always synchronously moved in planes defined by the length of the hollow section 226 of the extended section 110 and the length of the second guide 100.

In the present invention, besides the above noted embodiments, the first connecting means may directly connect the first slider to the second slider. The first driving means and the second driving means may be belt drive mechanisms other than ball bearing screws. When the first slider and the third slider move sychronously, it is not necessary to coincide their coordinates of the two dimentional movement. Synchronous movement of the two sliders with different coordinates can be designed.

Further, the drive system of the present invention can be applied not only the chip-inserting machine but many other machines such as an assembling machine which can assemble parts from two directions.

Preferred embodiments of the present invention have been described in detail but the present invention is not limited to the above stated embodiments, and modifications can be allowed without deviating from the scope of the invention.

In the drive system of the present invention, the first and third sliders can be synchronously moved with symple structure. Therefore, two sliders can be moved by only one system, so that the system has compatibility and economical advantage.

What is claimed is:
1. A drive system, comprising:
 a pair of first driving means for provided in parallel in first direction;
 a pair of second driving means provided in parallel in second direction perpendicular to the first direction;
 a pair of first travellers movably provided to said first driving means, said first travellers being movable along said first driving means;
 a pair of second travellers movably provided to said second driving means, said second travellers being movable along said second driving means;
 a first motor for driving said first driving means to synchronously move said first travellers in the first direction;
 a second motor for driving said second driving means to synchronously move said second travellers in the second direction;
 a first rod having both ends respectively connected to the first travellers, the first rod provided in parallel to the second driving means;
 a second rod having both ends respectively connected to the second travellers, the second rod provided in parallel to the first driving means;
 a first slider movably provided on said first rod and said second rod, said first rod and said second rod passing through said first slider;
 a first guide located away from a plane in which said first slider moves, said first guide provided in parallel to one of said driving means;
 a second slider being movable along said first guide;
 first connecting means for selectively connecting said second slider to one of said travellers, said second slider being movable along said first guide with the movement of said first slider when said first connecting means connects;
 a second guide provided on said second slider perpendicular to said first guide;
 a third slider being movable along said second guide; and
 second connecting means for selectively connecting said third slider to one of said travellers, said third slider being movable along said second guide with the movement of said first slider when said second connecting means connects said third slider to one of said travellers.

2. A drive system according to claim 1, wherein said first driving means are first ball bearing screws on which said first travellers are respectively screwed and said second driving means are second ball bearing screws on which said second travellers are respectively screwed, whereby said first travellers and said second travellers can be moved when said first motor and said second motor rotate said first ball bearing screws and said second ball bearing screws.

3. A drive system according to claim 1, wherein said first motor is single motor which drives said first driving means with a first transmitter, said second motor is single motor which drives said second driving means with a second transmitter.

4. A drive system according to claim 2, wherein said first motor is single motor which directly rotates said one of said first ball bearing screws and rotates the other with a first transmitter, said second motor is single motor which directly rotates one of said second ball bearing screws and rotates the other with a second transmitter.

5. A drive system according to claim 1, wherein said first connecting measn is composed of a cylinder and a rod-body which can be fitted into the cylinder, the rod-body and the cylinder are connected by having negative pressure in the cylinder when the rod-body fits into the cylinder.

6. A drive system according to claim 1, wherein said first connecting means is a cylinder unit whose cylinder proper is fixed to one of said travellers, and a front end of the rod of the cylinder unit is fixed to said second slider, whereby the rod can be freely extended and drawn when the cylinder unit is not driven.

7. A drive system according to claim 1, wherein said first slider and said third slider locate at same two dimentional coordinates when said first connecting means and said second connecting means connect.

8. A drive system, comprising:
 a pair of first driving means provided in parallel in first direction;

a pair of second driving means provided in parallel in second direction perpendicular to the first direction;

a pair of first travellers movably provided to said first driving means, said first travellers being movable along said first driving means;

a pair of second travellers movably provided to said second driving means, said second travellers being movable along said second driving means;

a first motor for driving said first driving means to synchronously move said first travellers in the first direction;

a second motor for driving said second driving means to synchronously move said second travellers in the second direction;

a first rod having both ends respectively connected to the first travellers, said first rod provided in parallel to the second driving means;

a second rod having both ends respectively connected to the second travellers, said second rod provided in parallel to the first driving means;

a first slider movably provided on said first rod and said second rod, said first rod and said second rod passing through said first slider;

a first guide located away from a plane in which said first slider moves, said first guide provided in parallel to said first driving means or said second driving means;

a second slider being movable along said first guide;

first connecting means for selectively connecting said second slider to one of said travellers, said second slider being movable along said first guide with the movement of said first slider when said first connecting means connects;

a second guide provided on said second slider perpendicular to said first guide; and a third slider being movable along said second guide, said third slider connected to one of said travellers.

9. A drive system according to claim 8, wherein said first driving means are first ball bearing screws on which said first travellers are respectively screwed and said second driving means are second ball bearing screws on which said second travellers are respectively screwed, whereby said first travellers and said second travellers can be moved when said first motor and said second motor rotate said first ball bearing screws and said second ball bearing screws.

10. A drive system according to claim 8, wherein said first motor is single motor which drives said first driving means with a first transmitter, said second motor is single motor which drives said second driving means with a second transmitter.

11. A drive system according to claim 9, wherein said first motor is single motor which directly rotates said one of said first ball bearing screws and drives the other with a first transmitter, said second motor is single motor which directly drives one of said second ball bearing screws and rotates the other with a second transmitter.

12. A drive system according to claim 8, wherein said first connecting means is composed of a cylinder and a rod-body which can be fitted into the cylinder, the rod-body and the cylinder are connected by having negative pressure in the cylinder when the rod-body fits into the cylinder.

13. A drive system according to claim 8, wherein said first connecting means is a cylinder unit whose cylinder proper is fixed to one of said travellers, and a front end of the rod of the cylinder unit is fixed to said second slider, whereby the rod can be freely extended and drawn when the cylinder unit is not driven.

14. A drive system according to claim 8, wherein said first slider and said third slider locate at same two dimentional coordinates when said first connecting means and said second connecting means connect.

15. A drive system,
comprising:

a pair of first driving means provided in parallel in first direction;

a pair of second driving means provided in parallel in second direction perpendicular to the first direction;

a pair of first travellers movably provided to said first driving means, said first travellers being movable along said first driving means;

a pair of second travellers movably provided to said second driving means, said second travellers being movable along said second driving means;

a first motor for driving said first driving means to synchronously move said first travellers in the first direction;

a second motor for driving said second driving means to synchronously move said second travellers in the second direction;

a first rod having both ends respectively connected to the first travellers, said first rod provided in parallel to the second driving means, a second rod having both ends respectively connected to the second travellers, said second rod provided in parallel to the first driving means;

a first slider movably provided on said first rod and said second rod, said first rod and said second rod passing through said first slider;

a first guide located away from a plane in which said first slider moves, said first guide provided in parallel to said first driving means or said second driving means;

a second slider being movable along said first guide, said second slider connected to said first traveller or said second traveller; and a third slider being movably along said second guide, said third slider connected to one of said travellers.

16. A drive system according to claim 15, wherein said first driving means are first ball bearing screws on which said first travellers are respectively screwed and said second driving means are second ball bearing screws on which said second travellers are respectively screwed, whereby said first travellers and said second travellers can be moved when said first motor and said second motor rotate said first ball bearing screws and said second ball bearing screws.

17. A drive system according to claim 15, wherein said first motor is single motor which drives said first driving means with a first transmitter, said second motor is single motor which drives said second driving means with a second transmitter.

18. A drive system according to claim 16, wherein said first motor is single motor which directly rotates said one of said first ball bearing screws and rotates the other with a first transmitter, said second motor is single motor which directly rotates one of said second ball bearing screws and rotates the other with a second transmitter.

19. A drive according to claim 15, wherein said first slider and said third slider locate at the same two dimensional coordinates when said first connecting means and said second connecting means connect.

* * * * *